(12) United States Patent
Cowle et al.

(10) Patent No.: US 6,339,495 B1
(45) Date of Patent: Jan. 15, 2002

(54) OPTICAL AMPLIFIER WITH POWER DEPENDENT FEEDBACK

(75) Inventors: Gregory J. Cowle, Painted Post; Douglas W. Hall; Thomas W. McNamara, both of Corning, all of NY (US); Chiachi Wang, Hillsborough, NJ (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/451,314

(22) Filed: Nov. 30, 1999

Related U.S. Application Data (60) Provisional application No. 60/114,996, filed on Jan. 6, 1998.

(51) Int. Cl.$^7$ .......................... H04B 10/17; H04J 14/02
(52) U.S. Cl. ................ 359/341.4; 359/174; 359/337.1; 359/341.32; 372/31
(58) Field of Search ................................ 359/174, 124, 359/194, 337, 341, 346–348, 337.11, 341.32, 341.4; 372/8, 31, 76

(56) References Cited

U.S. PATENT DOCUMENTS

| | | | | |
|---|---|---|---|---|
| 5,128,800 A | * | 7/1992 | Zinngrbl ..................... | 359/341 |
| 5,446,573 A | * | 8/1995 | Lomashevitch et al. .... | 359/158 |
| 5,572,357 A | * | 11/1996 | Nakazato et al. ........... | 359/341 |
| RE36,802 E | * | 8/2000 | Geels .......................... | 372/45 |

OTHER PUBLICATIONS

Chieng et al, IEEE Photonics Tech. Lett., vol. 7, #5, pp 485–487; abstract only herwith, May 1995.*
Chieng et al, 19th Australian Conf. Optical Feb. Tech., pp 4–7, abst. only herewith, Dec. 7, 1994.*
Stanly, J.C., Purdue University thesis, 70pp AN 275677, Order No. 76–18741. abst. herewith, 1977.*

Bhawalkar et al, Opto–Electronics, vol. 4, #3, pp 225–234; abstract herewith, Aug. 1972.*

Wang et al. "Optical Gain Control of Erbium–Doped Fiber Amplifiers with a Saturable Absorber" Technical Digest $10^{th}$ Optical Amplifiers and Their Applications, Jun. 9–11, 1999 Nara Japan.

Eskildsen et al. "Self–Regulating WDM Amplifier Module for Scalable Lightwave Networks" IEEE Photonics Technology Letters, vol. 6, No. 11, Nov. 1994.

* cited by examiner

Primary Examiner—Nelson Moskowitz
(74) Attorney, Agent, or Firm—Svetlana Short

(57) ABSTRACT

An optical amplifier includes an optical feedback resonant laser cavity (OFRC) including a power dependent loss element (PDLE) having the characteristic that as the incident laser power on the PDLE increases the cavity loss decreases. The OFRC with the PDLE provides optical gain control or optical power control for a WDM amplifier or a single channel power equalization amplifier (PEA), respectively. A 1×N×N WADM node incorporating more than one of these amplifiers, at least some of which commonly share a pump source, and a method for controlling a transient power change in a single channel optical amplifier or reducing a DC gain error in a WDM optical amplifier that are subject to dynamically variable operating conditions at an input of the amplifier, are also disclosed.

36 Claims, 9 Drawing Sheets

OPTICAL AMPLIFIER WITH POWER DEPENDENT FEEDBACK

This application claims benefit of Prov. No. 60/114,996 filed Jan. 6, 1998.

BACKGROUND OF THE INVENTION

1. Field of the Invention

The present invention relates generally to fiber optical WDM transmission systems and optical amplifiers used therein, and more particularly to an optical feedback resonant laser cavity (OFRC), including a power dependent loss element (PDLE) for optical gain control (OGC) or optical power control (OPC), and to a method for implementing such control, which is particularly useful, although not so limited, in amplified wavelength add/drop multiplexed (WADM) transmission nodes.

2. Technical Background

Wavelength division multiplexing (WDM) is a demonstrated technology for increasing the capacity of existing fiber optic networks. A typical WDM system employs multiple optical signal channels, each channel being assigned a particular wavelength or wavelength band. In a WDM system, optical signal channels are generated, multiplexed to form an optical signal comprised of the individual optical signal channels, transmitted over a single waveguide, and demultiplexed such that each channel is individually routed to a designated receiver. Multiple optical channels can be amplified simultaneously in optical amplifiers such as erbium doped fiber amplifiers (EDFAs), facilitating the use of WDM systems for long distance transmission.

Add-drop multiplexers are used, for instance, at nodes in a WDM communication network to extract one or more channels from the multiplexed stream, letting the remaining channels pass through unaltered to the next node, and to add to the multiplexed stream a new channel for transmission. Another application of such devices is for routing nodes of reconfigurable optical networks, namely rerouting certain information streams as a result of changed traffic conditions or to remedy a failure downstream from the node.

Figure 1:
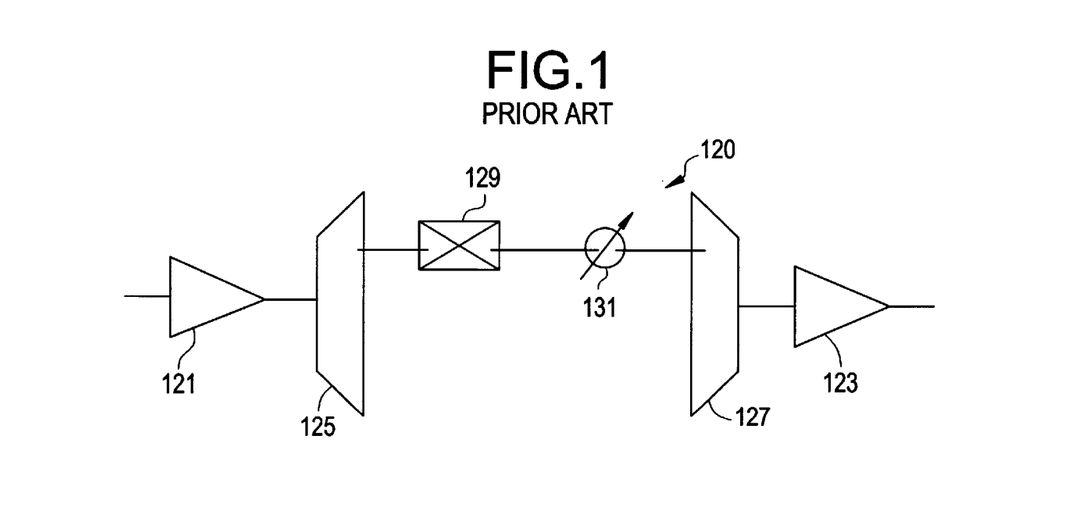
FIG. 1 is a schematic illustration of a conventional 1×N×1 WADM node with a single input and output amplifier.

As schematically illustrated in FIG. 1. a conventional WADM node 120 consists respectively of gain-controlled input and output amplifiers 121, 123, a pair of 1×N and N×1 multiplexers/demultiplexers 125, 127, and an array of add/drop switches 129. This type of WADM node is herein referred to as a 1×N×1 node since there is a single input amplifier and a single output amplifier, both of which are likely gain flattened and gain controlled amplifiers. Wavelength add/drop multiplexing permits signals to be routed from different networks or propagate through different spans. As a result, however, the per channel power after each add/drop switch can vary significantly, say by YdB. An approach to equalize channel power at the output of each node is to monitor per channel power and to use a variable optical attenuator (VOA) 131 in each channel path to maintain constant channel power. Due to the characteristically slow VOA response, however, the settling time for channel adding varies from milliseconds to seconds depending upon the VOA technology employed. Although VOA response times are not currently problematic (as some traffic interruption is expected for switched channels), there is a significant pump power penalty in the output amplifier imposed by the required protection of the surviving channels. For example, a VOA with a feedback control has to level the channel power which may vary between channels by a value of YdB (that is, by $10^{(Y/10)}$) times as much on a linear scale), as mentioned above. To protect the signal in a worst case where N×1 channels are added simultaneously. all with a YdB excess power, the pump power of the output amplifier needs to support $(10^{(Y/10)} \times (N-1))+1$ channels of power before the VOA can respond. In other words, the pump power penalty to protect the surviving channel is almost YdB if N is large.

Figure 2:
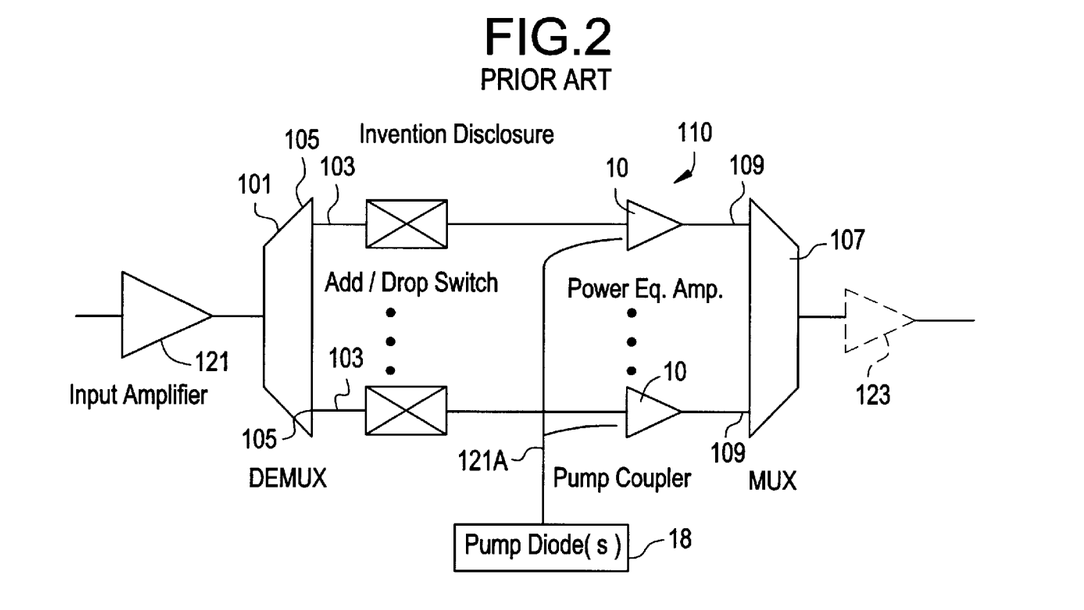
FIG. 2 is a schematic illustration of a conventional 1×N×N WADM node with parallel power equalization amplifiers (PEAs) and a commonly shared pump.

One suggested approach to address this problem consists of replacing the VOAs and the output amplifier of the 1×N×1 architecture with multiple parallel power equalization amplifiers (PEAs) as schematically shown in FIG. 2, to form what is referred to herein as a 1×N×N architecture because there are N optically controlled outputs. Each PEA can be designed to operate in its saturation regime so that the output signal power is determined by the pump power and is substantially independent of the input powers. Simulation results have shown that it is possible for the output power of these PEAs to differ by only 0.5 dB for an input power difference of 6 dB, and a 1dB difference has been experimentally demonstrated. Although this approach is cost effective in that the VOAs and a complex output amplifier are eliminated from the system, and separate pump diodes for each PEA are replaced by a shared pump source, there is a recognized need for transient (as channels are added/dropped ) power control of each of the parallel amplifiers. Without such control the inversion of the amplifier is higher when a channel is dropped, and there is a large transient power spike when another channel is added back into the amplifier. Repeatedly amplifying this transient spike along the amplifier chain may result in component damage or an even greater pump power penalty to protect the surviving channels. However, because these parallel amplifiers share the pump source, individual transient control is not easily achieved by conventional electrical control such as by regulating the pump power.

One way of addressing this issue is to incorporate an optical feedback resonant laser cavity (OFRC) in each PEA so that the transient control is individually applied to these parallel amplifiers, even though they commonly share the pump power. For controlling the power transient of the PEAs, the OFRC is configured so that an optical power control (OPC) laser turns on (lases) when a signal channel is dropped from the PEA. Ideally, the OPC laser turns off (stops lasing) when a signal channel appears in the PEA, so that the PEA is only saturated by the signal channel and the signal channel extracts all of the available energy provided by the pump power. However, because there may be a power variation of YdB among the signal channels, the OPC laser has to be turned off by a signal channel having the lowest possible channel power. In order to achieve this operating condition, the cavity loss of the OFRC must be high. However, a high loss produces a low OPC laser power when the laser turns on, and thus a high amplifier inversion. As a result, if a signal channel with a high power is added into the highly inverted PEA which is saturated by an OPC laser with low power, there will be a transient power spike due to that high inversion. To eliminate the transient spike, the OFRC requires a lower cavity loss and higher OPC laser power. This presents the paradox of having a high loss and a low loss in the OFRC.

In addition to the transient power control of the PEAs, discussed above, the WDM input amplifiers shown in FIG. 1 and FIG. 2 are gain-controlled to reduce steady-state (DC) gain error. A common technique to implement such control in a WDM optical amplifier involves configuring each amplifier with an OFRC such as an optical gain control (OGC) laser cavity. It is well known for such a configuration that the optical gain must equal the passive loss at the lasing wavelength. As a result, for a homogeneous medium the optical gain at all wavelengths in a given spectrum is locked once the gain is fixed at any particular wavelength. Thus the gain spectrum of the amplifier is determined once the OGC laser wavelength and the passive loss at that wavelength are determined.

It is now appreciated by those skilled in the art that an erbium doped fiber (EDF) is not a purely homogeneous medium for light amplification; rather, it exhibits a certain degree of inhomogeneity. This circumstance gives rise to the phenomenon of spectral hole burning. When the power of the OGC laser is increased, for example, by dropping channels or by increasing the pump power, the spectral hole at the lasing wavelength gets deeper and results in a steady-state (DC) gain error in the signal band. This is illustrated schematically in FIG. 3(a). Accordingly, there is a need to solve the gain error problem caused by spectral hole burning by the OGC laser when signals are added or dropped, or the pump power is changed.

SUMMARY OF THE INVENTION

An embodiment of the present invention is directed to an optical amplifier that includes a gain medium; a pump source coupled thereto to excite the gain medium; an optical feedback resonant laser cavity (OFRC) coupled to the gain medium; and a power dependent loss element (PDLE) in the OFRC which exhibits a decreasing loss as a function of increasing incident laser power. The OFRC with a PDLE according to the invention provides optical gain control (OGC) for a WDM amplifier or optical power control (OPC) for a single channel amplifier, when either of which are subject to dynamically changing amplifier input conditions. In a preferred aspect of this embodiment, the PDLE is a passive mechanism such as a saturable absorber. The saturable absorber can be a length of rare earth doped fiber, and more preferably an erbium doped fiber. In an alternative aspect the PDLE can be an active mechanism such as a light intensity modulator, namely an acousto-optic modulator or an electrooptic modulator, with a feedback control. The preferable OFRC is in the form of a ring cavity, or alternatively a linear cavity. The OFRC structure and associated components used to couple the OFRC to the amplifier will substantially determine the lasing wavelength of the laser. For example, a ring cavity will preferably be coupled to the amplifier via two wavelength selective couplers which transmit the signal band wavelengths and couple the wavelength band of the OGC laser or OPC laser to the feedback cavity. Similarly, a linear cavity will preferably utilize a grating structure as a cavity end reflector/transmitter with the reflected light corresponding to the lasing wavelength and the transmitted light corresponding to the signal band wavelengths. The amplifier is preferably an EDFA, but alternatively could be a semiconductor amplifier. a Raman amplifier, a Brillouin amplifier, or other type of amplifier operating over conventional or extended optical bandwidths.

In another embodiment, a wavelength add/drop multiplexed (WADM) amplified optical transmission node includes an $M_{in} \times N_{out}$ port demultiplexer with $M_{in} \geq 1$ and $N_{out} > 1$ for demultiplexing an optical signal having a wavelength range $\Delta\lambda_{in}$ into a plurality of N optical signals each having a discreet wavelength $\lambda_i$ (i=1 to N), or a plurality of N optical signals each having a wavelength range $\Delta\lambda_j$ (j=1 to N−1); N add/drop signal propagation paths each coupled at one end thereof to an $N_{out}$ port, wherein each signal propagation path includes an optical amplifier having a gain medium; and an $N_{in} \times Z_{out}$ multiplexer with $Z_{out} \geq 1$ for multiplexing at least some of the $N_{in}$ optical signals, coupled to another end of the N add/drop signal propagation paths, and which is characterized in that a plurality of the N optical amplifiers each includes an optical feedback resonant laser cavity (OFRC) coupled to the respective gain media of the amplifiers and further includes a power dependent loss element (PDLE) that exhibits a decreasing loss as a function of increasing laser light intensity input to the PDLE and vice-versa.

As described above with regard to the optical amplifier embodiment, the preferable OGC or OPC laser cavity is in the form of a ring cavity, or alternatively a linear cavity, and the lasing wavelength is substantially determined by the coupled wavelength. For example, a ring cavity will preferably be coupled to the amplifier via two wavelength selective couplers which transmit the signal band wavelengths and couple the laser wavelength. Similarly, a linear cavity will preferably utilize a grating structure as a cavity end reflector/transmitter with the reflected light corresponding to the lasing wavelength and the transmitted light corresponding to the signal band wavelengths. In a preferred aspect of this embodiment, the PDLE again is a passive mechanism such as a saturable absorber. The saturable absorber can be a length of rare earth doped fiber, and more preferably an erbium doped fiber. In an alternative aspect, the PDLE similarly can be an active mechanism such as a light intensity modulator, namely, an acousto-optic modulator, with a feedback control.

In a further embodiment of the invention, a method for controlling a transient power change in a single channel optical amplifier or reducing a DC gain error in a WDM optical amplifier that are subject to dynamically variable operating conditions at an input of the amplifier, and including an OFRC coupled to a gain medium of the amplifier having an output power that is dynamically dependent upon the operating conditions, includes the step of decreasing the cavity loss of the OFRC as the output power of the OFRC increases or vice-versa, whereby the inversion of the amplifier gain medium is dynamically varied to reduce gain or power changes in the amplifier.

The invention described herein provides a device and method for improved optical gain or power control. The advantages of optical (in contrast to electronic) control are well appreciated and include the attributes of being passive (that is, substantially independent of gain ripple, signal input powers, and pump power) and self-contained. The invention is especially useful in WADM applications, as well as for soliton propagation systems, in which precise channel powers are important, and which benefit from the power "re-equalization" at each 1×N×N node. Since at each 1×N×N node the channel power is re-equalized after a PEA such that the output power is independent of the input power, gain ripple does not accumulate along a chain of amplifiers.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed:

The accompanying drawings are included to provide a further understanding of the invention, and are incorporated in and constitute a part of this specification. The drawings illustrate embodiments of the invention. and together with the description serve to explain the principles and operation of the invention.

DETAILED DESCRIPTION OF PREFERRED EMBODIMENTS

Figure 4:
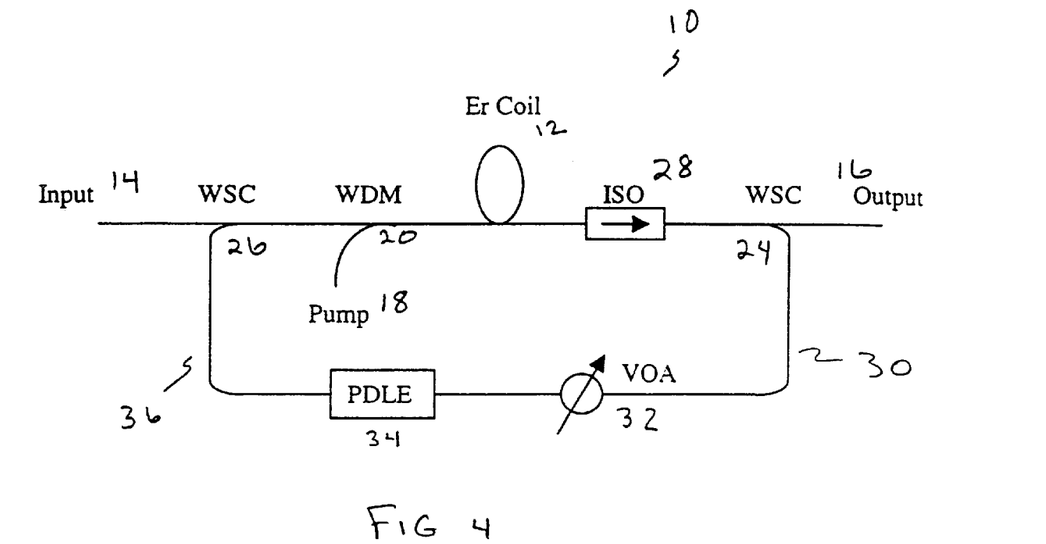
FIG. 4 is a schematic illustration of an amplifier with an OFRC including a PDLE according to an embodiment of the invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the optical amplifier of the present invention is shown in FIG. 4, and is designated generally throughout by reference numeral 10.

Prior to describing the invention, it will assist the reader in understanding the invention and its many attributes to have a plain understanding of the underlying physics in reference to the two types of optical control described herein, namely optical power control (OPC) and optical gain control (OGC).

Optical Power Control

A power equalization amplifier (PEA) as used herein is a single optical signal channel amplifier operated in saturation, in contrast to a WDM amplifier (described below with respect to optical gain control). When the signal channel is dropped, there is no longer any saturating signal in the PEA, and consequently the inversion of the PEA is relatively high. If a signal channel is then added by inputting it to the amplifier under this high inversion condition, there will be a transient power spike which is known to be detrimental. The idea behind optical power control (OPC) via an optical feedback resonant cavity (OFRC) is to "turn on" an OPC laser when the signal is dropped such that the power of the OPC laser increases to regulate the amplifier inversion. This "turning on" of the OPC laser can be achieved by controlling the loss in the optical feedback cavity. If the amplifier gain at the OPC laser wavelength in the signal-drop state is higher than the optical feedback cavity loss, the OPC laser will turn on (lase) and drive the amplifier gain down to a value equal to the cavity loss when the signal is dropped. The OPC laser then saturates the amplifier and regulates the amplifier inversion. Ideally, the OPC laser will "turn off" when a signal channel is added into the amplifier; otherwise, the OPC laser extracts part of the energy provided by the pump source, and the concept of power equalization via saturating the PEA with only the signal is defeated. Furthermore, since the signal power may change by a factor such as YdB, it is important that the OPC laser turns off with the adding of the signal channel having the lowest possible channel power. This can be achieved by putting a fixed (high) loss in the optical feedback cavity. At the OPC laser wavelength, the loss must be higher than the gain of the amplifier saturated by the lowest possible signal power so that when the signal appears, the OPC laser stops lasing. However, a high cavity loss means a low OPC laser power and a high amplifier inversion when the signal is dropped. If the added channel has higher power, then there occurs a transient power spike due to the high amplifier inversion. To reduce the transient power spike, the fixed loss in the optical feedback cavity must decrease. If the cavity loss is fixed, there is the paradox of having a high or a low optical feedback cavity loss.

This paradox is addressed by the invention by incorporating a PDLE as described herein within the optical feedback laser cavity. When the signal appears, the OPC laser power reduces due to energy conservation. As a result, the loss in the cavity from the PDLE increases. An increasing power dependent loss in the optical feedback cavity decreases the OPC laser power even further. The feedback effect between the PDLE and the OPC laser power then turns the OPC laser off. With the PDLE, the OPC laser can be turned off with a weak signal power. On the other hand, when the signal is dropped, the amplifier inversion (amplifier gain) and the amplified spontaneous emission (ASE) increase. When more ASE around the center wavelength of the wavelength selective component is fed into the cavity and to the PDLE, the loss of the PDLE.drops. Thus the cavity loss decreases resulting in more feedback in the cavity and an increase in the intensity of the ASE fed into the cavity. Eventually the power dependent loss becomes low enough that the OPC laser turns on, and the PDLE is driven by the OPC laser to its low loss condition. With a PDLE according to the invention, the cavity has low loss once the OPC laser turns on and the gain medium has a low inversion. In addition, when the OPC laser turns on, the amplifier inversion is comparable to the inversion that is saturated by the highest possible added signal power. Thus the transient power spike resulting from adding a high power signal is reduced.

Optical Gain Control

Figure 3A:
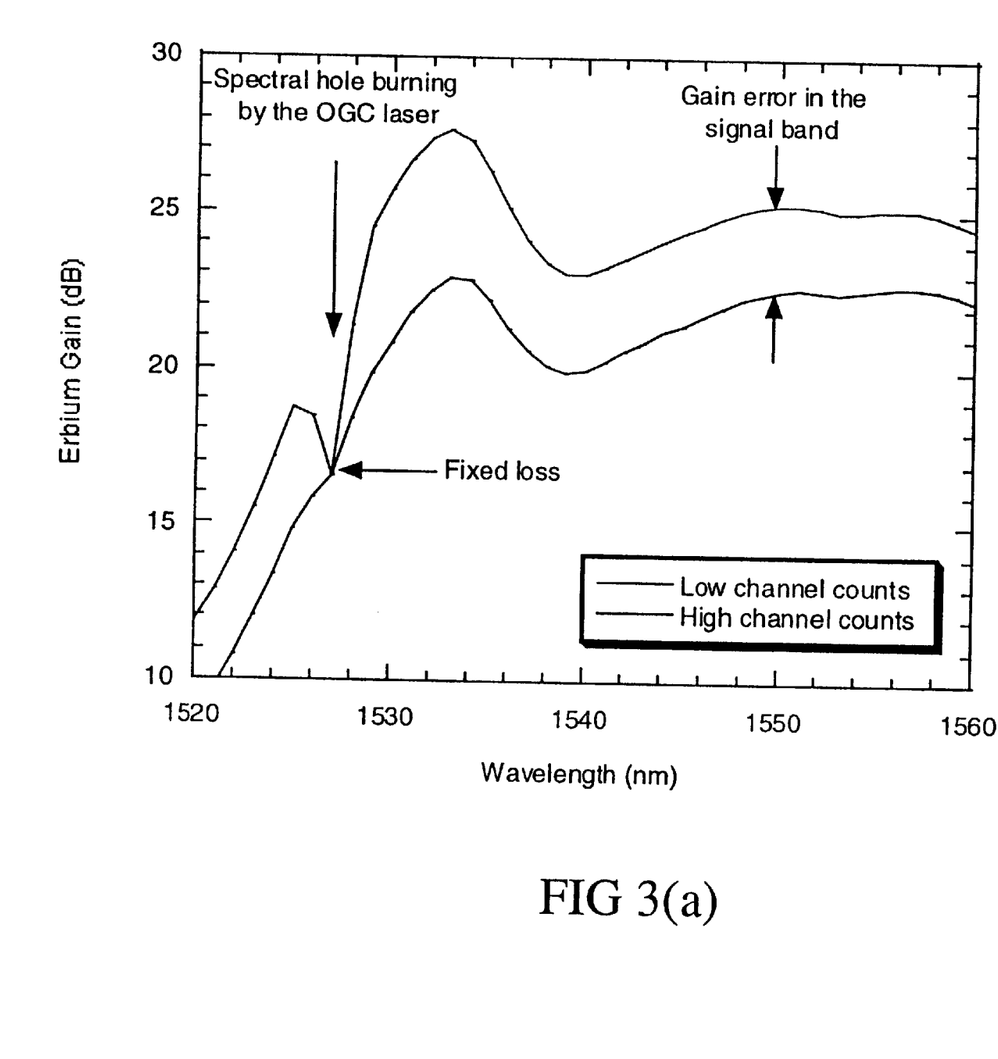
FIG. 3(a) is a plot of two gain versus wavelength curves for different signal channel counts without a PDLE according to the invention.
Figure 3B:
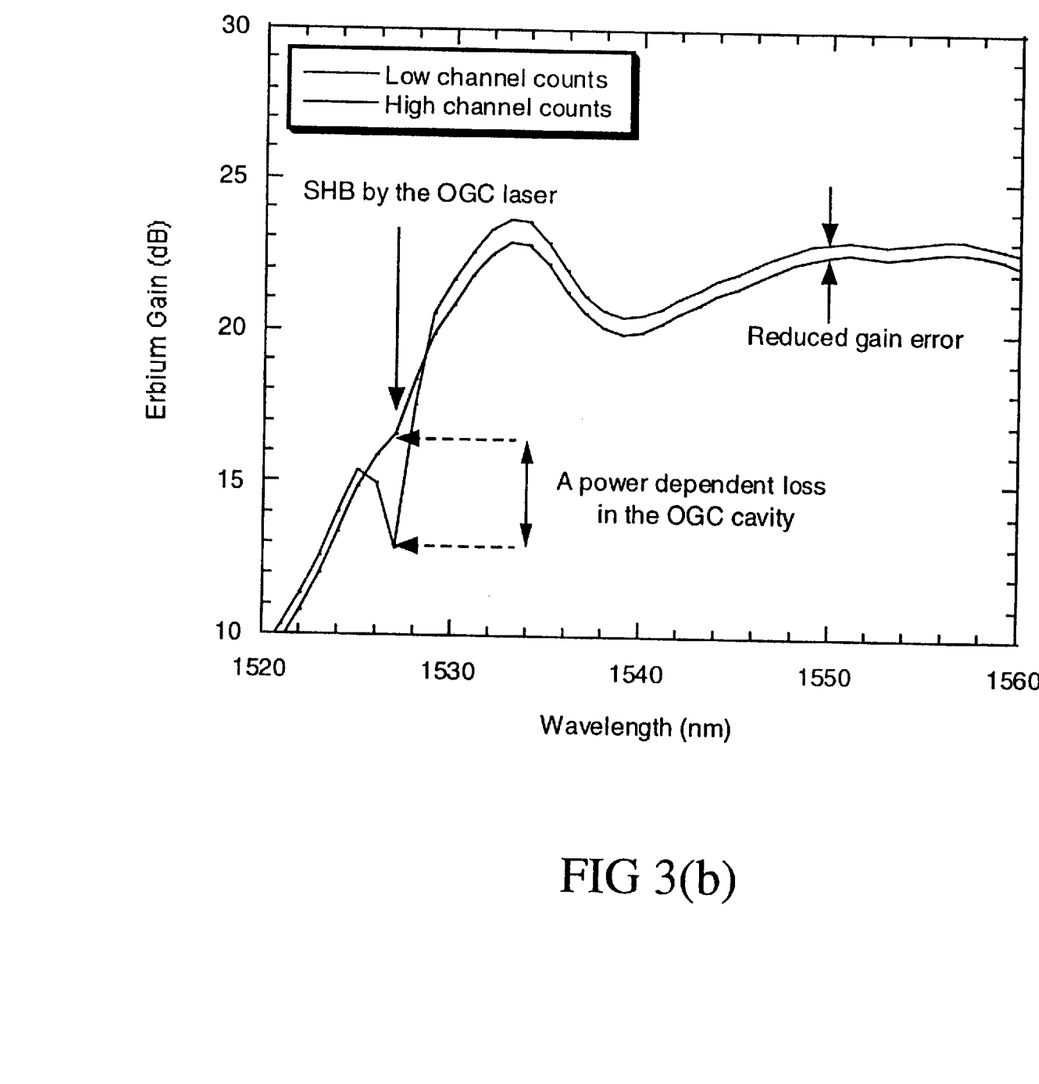
FIG. 3(b) is a plot of two gain versus wavelength curves for different signal channel counts with a PDLE according to the invention.

Typically an EDFA is operated in its saturation regime. Thus the gain spectrum of a multichannel (WDM) EDFA changes as amplifier input conditions such as input power or pump power vary. This leads to, among other things, gain excursions, which are known to be detrimental. The idea behind optical gain control (OGC) via an optical feedback resonant cavity (OFRC) is to dynamically vary the power of an OGC laser as the input conditions change in order to compensate for the resulting gain excursion. However, because the erbium gain medium is inhomogeneous, the OGC laser burns a spectral hole in the gain spectrum at the OGC lasing wavelength. As a result, when the power of the OGC laser is increased by the dropping of channels or by an increase of the pump power, for example, the spectral hole at the lasing wavelength gets deeper. If the laser cavity loss is fixed, the inversion of the pumped erbium gain medium must increase to maintain the optical gain at the bottom of the spectral hole at a value equal to the optical loss. Thus the gain on the channels being amplified increases to cause a DC gain error. This is illustrated in FIG. 3($a$) (no PDLE within the cavity). In contrast, as illustrated in FIG. 3($b$), when a PDLE according to the invention is incorporated in the laser cavity such that the cavity loss decreases with an increase in the incident OGC laser light intensity, the power dependent loss lowers the amplifier inversion and compensates for the effect of increasing the inversion caused by the spectral hole burning by the OGC laser. Thus the DC gain error is reduced.

In accordance with the invention, with reference to FIG. 4, an optical fiber amplifier 10 includes a gain medium in the form of a length of erbium doped fiber (EDF) 12 coupled to an input 14 and an output 16 of the amplifier. An optical feedback resonant laser cavity (OFRC) 30, preferably in the form of a ring cavity, is connected to the amplifier via wavelength selective couplers 24, 26 on the downstream and upstream sides, respectively, of the EDF 12. The coupled wavelength from and into the couplers 24, 26 substantially determines the laser wavelength in the OFRC 30. An optical isolator 28 preferably determines the direction of the laser signal (the direction of the OGC laser or the OPC laser) which, as shown, travels in a clockwise direction co-directionally with the input signal. A pump source 18 for exciting the EDF gain medium is coupled to an input of the EDF 12 via coupler 20 which is preferably a WDM coupler. The pump source 18 is preferably a 980 nm or 1480 nm laser diode. The arrangement shown in FIG. 4 provides for a co-propagating signal and pump (left to right in FIG. 4); however, it will be appreciated that the pump source 18 may also be arranged nearer an output of the EDF 12 such that it counter-propagates relative to the signal. Alternatively, the amplifier 10 could utilize side excitation or cladding pumping as are well known in the art. In the exemplary embodiment shown in FIG. 4, a variable optical attenuator (VOA) 32 is located within the OFRC 30 along with a power dependent loss element (PDLE) 34 that is also located within the OFRC downstream of the VOA 32.

Figure 5:
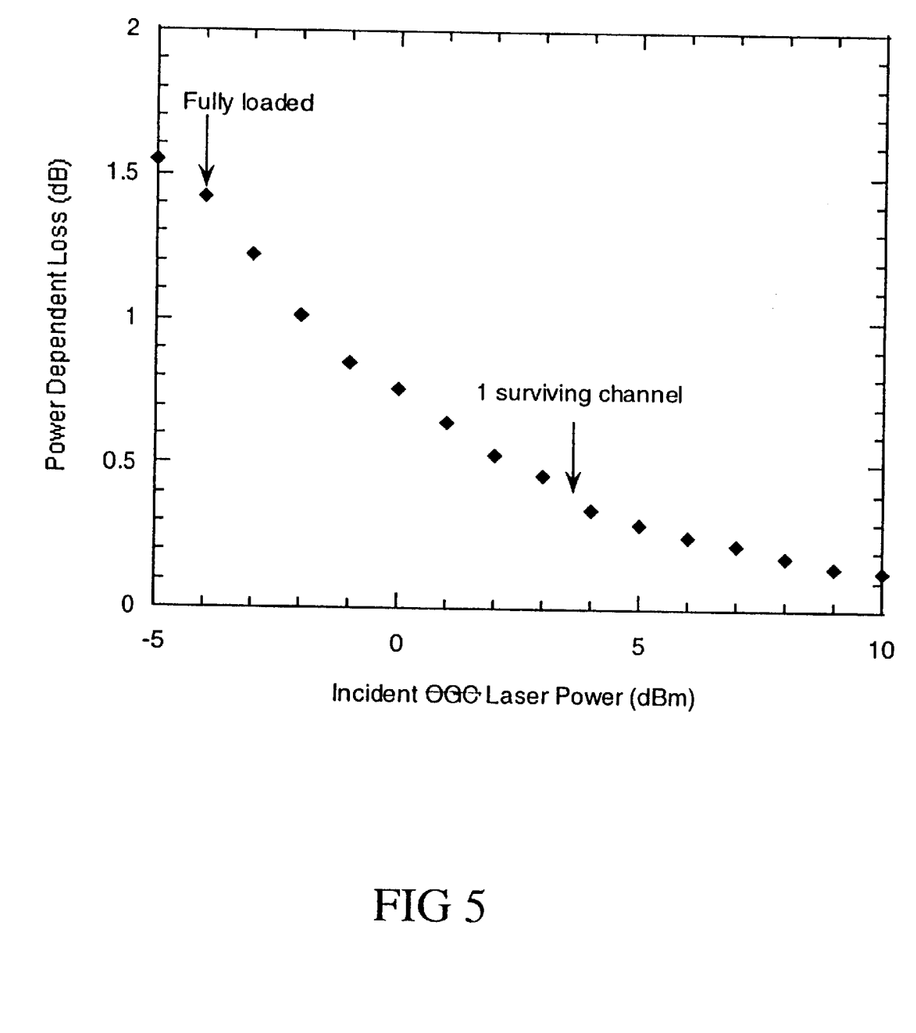
FIG. 5 is a plot of power dependent loss versus incident laser power from an OGC laser for a PDLE according to an embodiment of the invention.

According to the invention, the PDLE 34 is characterized such that its loss value (and thus the cavity loss) decreases with increasing incident light intensity from the OGC laser or the OPC laser. This is illustrated in FIG. 5 which schematically shows the power dependent loss characteristic of the PDLE 34. As shown, the loss of the PDLE decreases non-linearly as the incident light intensity to the PDLE increases. In a preferred embodiment, the PDLE is a passive structure such as a saturable absorber. One skilled in the art will understand that an EDF is well suited to this application because of electron dynamics between the $I_{13/2}$ state and the ground state. Most preferably, the saturable absorber is a length of EDF 12 having a short $I_{13/2}$ state Er ion lifetime, on the order of <1 ms. Other saturable absorbers such as dyes, or semiconductor saturable absorbers, are also suitable. In an alternative embodiment, the PDLE 34 is an active device that modulates the laser light intensity, such as an acoustooptic modulator with feedback control to adjust the cavity loss dynamically according to the loading condition of the amplifier.

The ring geometry OFRC 30 combined with the PDLE 34 according to the invention effectively provides optical gain control (OGC) or optical power control (OPC) for a WDM amplifier or PEA, respectively. It will be appreciated however that an alternative configuration could comprise a linear OFRC geometry (not shown) having appropriate end reflectors such as mirrors, gratings, filters, or other suitable components.

Although the combination of the pump source 18 and the EDF 12 provides a signal amplifying medium in the 1500 nm telecommunications window (C-band from about 1520–1565 nm and L-band from about 1565–1625 nm), the invention is not intended to be so limited; rather, as will be appreciated by one skilled in the art, any suitable spectrally appropriate gain medium may be utilized. Some examples include a semiconductor optical amplifier with a current pump source or a different rare earth doped waveguide of a glass, glass ceramic, hybrid, or other composition or form with an appropriate excitation source.

Figure 6:
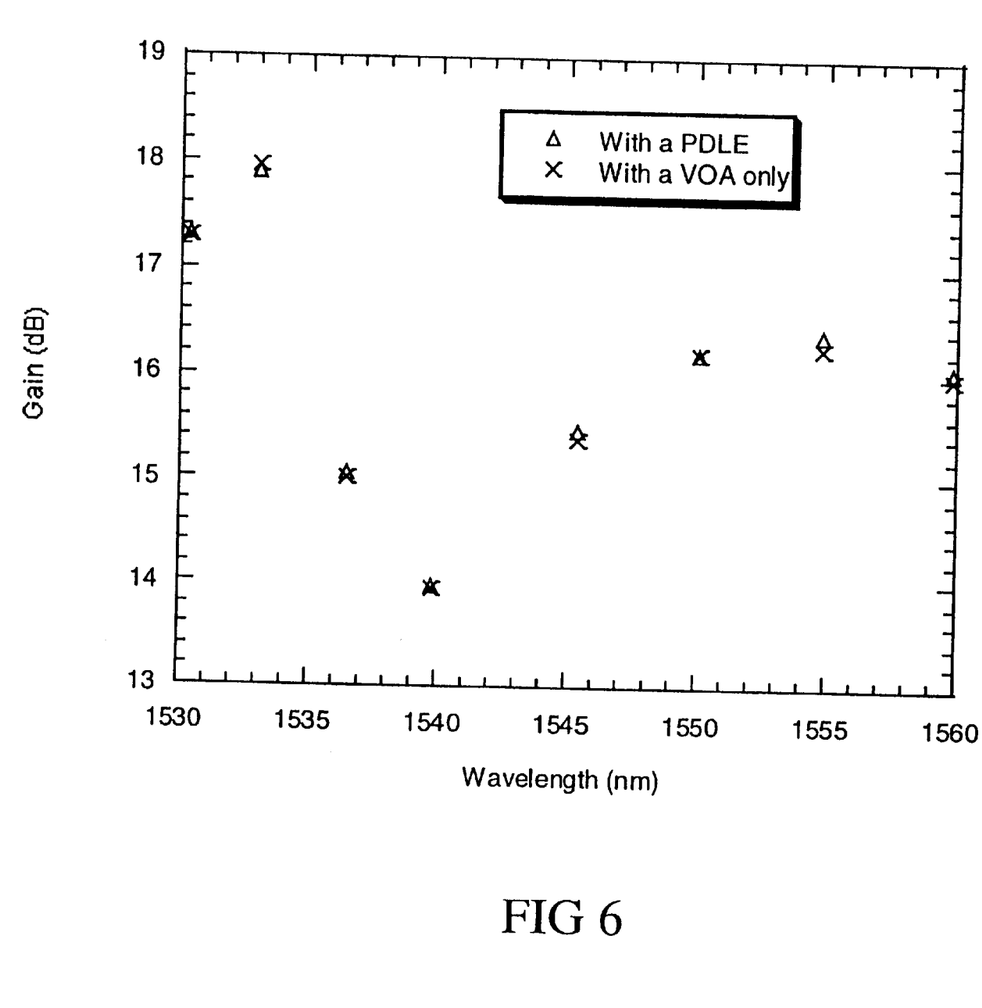
FIG. 6 is a plot of two sets of data points of gain versus wavelength for optical signals amplified by an OGC amplifier when the OGC cavity loss is fixed (VOA only) and when the OGC cavity contains a PDLE according to an embodiment of the invention.
Figure 7:
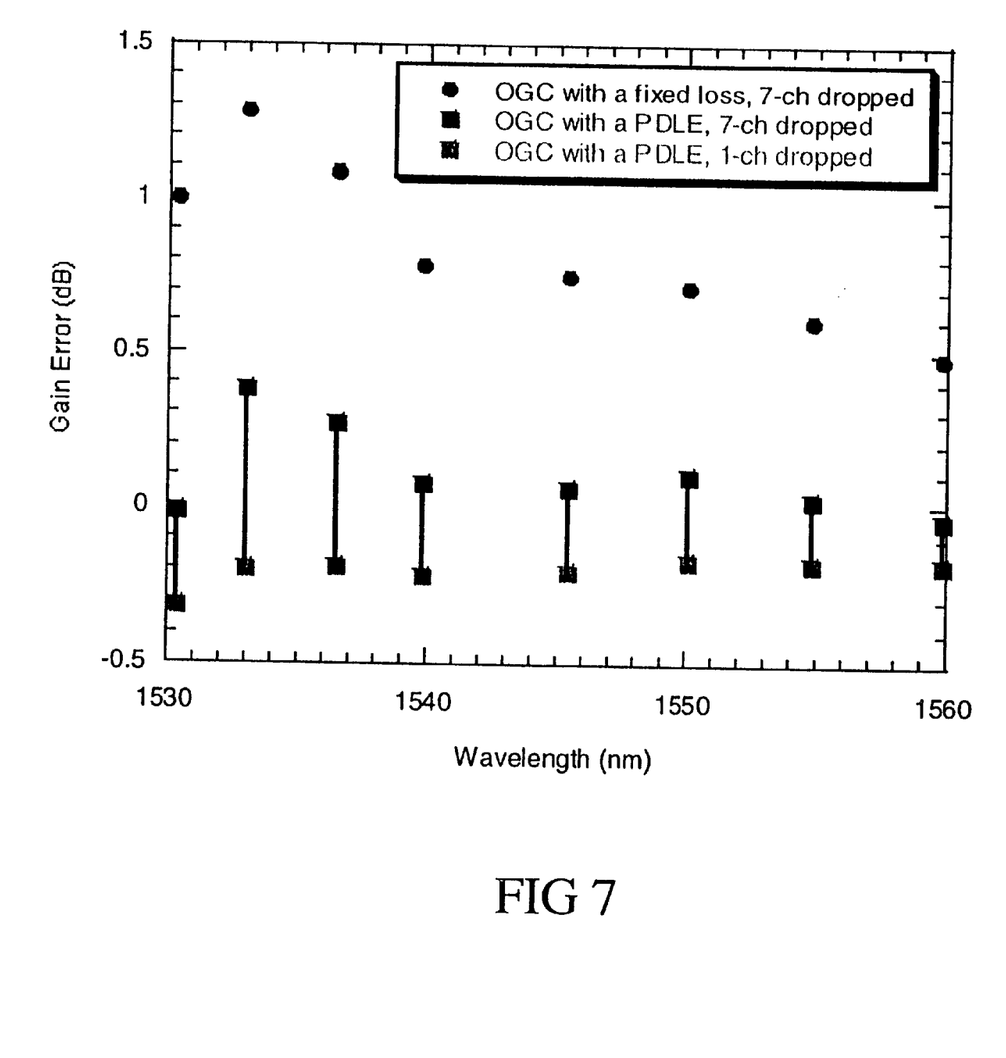
FIG. 7 is a set of plots of gain error versus wavelength for eight optical signal channels amplified by an OGC amplifier when seven channels and one channel, respectively, are dropped, when the amplifier has a fixed loss and a PDLE in the OGC cavity according to an embodiment of the invention.

Described below is an exemplary OGC embodiment of the invention, with reference to FIG. 4, which shows an EDFA 10 with an OFRC 30 including a power dependent loss element 34. The PDLE 34 is a 1 m long EDF 12 which exhibits a power dependent loss characteristic as shown in FIG. 5. The VOA 32 is set at 8.3 dB to provide a fixed loss for the laser cavity 30 at a lasing wavelength of 1527 nm, and to set the gain spectrum of the amplifier. The optical gains at eight wavelengths (channels) were measured with eight saturating signals having a per channel power of −10 dBm. For comparison, the performance of the OFRC 30 without a PDLE 34 and with a VOA 32 setting of 9.5 dB was also characterized. The gain spectra for the two conditions, shown in FIG. 6, are essentially the same and exhibit an average gain of about 16 dB. The required pump power to provide the gain spectra was 20.8 dBm with the PDLE present. Each saturating channel actually represented four channels worth of power assuming the per channel output power is 0 dBm for a practical metropolitan WADM system. As a result, even though only 8 channels were used, the two OGC schemes were equivalently evaluated for EDFAs with 32-channel power loading. The gain error (ΔG) due to dropping of signal channels for the OGC schemes with and without the PDLE is shown in FIG. 7, where the gain error is defined to be the maximal deviation in gain from the fully loaded gain of the EDFA. Without the PDLE 34 in the OGC cavity 30, the gain of the surviving channels (which are not dropped) increases with the number of the dropped channels due to the increase of the spectral hole depth caused by the increase of the OGC laser power. For a worst case wherein seven channels are dropped simultaneously, the gain error is as large as about 1.3dB for the 1533nm channel. With a PDLE in the cavity, all of the channels acquire a negative gain error when one channel is dropped. When more channels are dropped, the channel gain increases. Finally, when seven channels are dropped, the gain error for the surviving channel reaches the positive maximum. The worst case gain error is about +0.4 dB for the 1533 nm surviving channel when the remaining seven channels are dropped.

The sign of the gain error for OGC with a PDLE 34 varies with the number of the dropped channels, as explained below. FIG. 5 shows the power dependent loss versus the OGC laser power incident on the PDLE, and the operational regime of the PDLE according to the exemplary embodiment. When the amplifier is fully loaded the incident OGC laser power to the PDLE is about −4 dBm, and the PDLE has a loss of about 1.4 dB. However, the power dependent loss is reduced to about 0.4 dB at the point where there is but one surviving signal channel input to the amplifier. It can be understood from the data curve in FIG. 5 that the power dependent loss is nonlinear relative to the incident OGC laser power (the slope is greater for more surviving channels). When the first channel is dropped the power dependent loss decreases too much to over-compensate for a small change of the OGC laser power and the spectral hole depth, resulting in a negative gain error.

Figure 8:
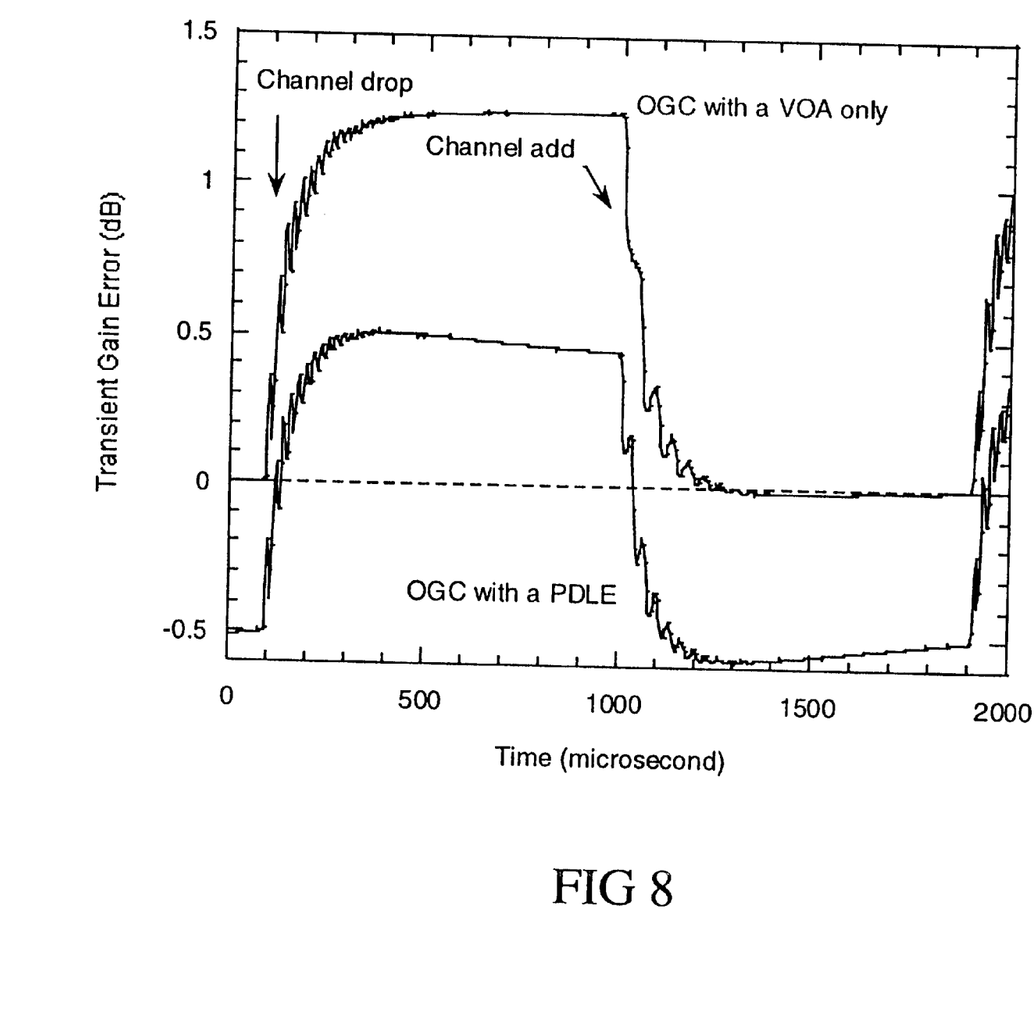
FIG. 8 is a two plot comparison graph of transient gain error versus time for a 1533 nm signal channel when the remaining channels are dropped and added for the OGC amplifier with and without a PDLE according to the invention.

The transient response of the 1533-nm channel due to adding or dropping the other seven channels is also characterized, and the results are illustrated in FIG. 8. The output of the amplifier 10 was band-pass filtered (about −20 dB over a 3 nm bandwidth) to ensure that only the power excursion of the one surviving channel was measured. For an OGC cavity without the PDLE 34 (VOA only), the gain of the 1533 nm channel overshoots the zero level by about 1 dB after 100 µsec of the drop transient (dropping the remaining seven channels). The gain error then gradually increases to the steady state value of about 1.3 dB. When the seven dropped channels are added back into the amplifier so that the amplifier is fully loaded, the gain error of the 1533 nm channel settles back to zero. The relaxation oscillations of the OGC laser are also shown imprinted on the surviving channel. In comparison, the transient response of the surviving channel for the case with the PDLE 34 in the OGC cavity 30 is also shown. When seven channels are dropped, the gain of the surviving channel increases by 0.5 dB (from the zero value on the vertical axis), and then is expected to settle to its steady state gain error of 0.4 dB. Upon adding seven channels back into the amplifier, the surviving-channel gain should recover to the gain value for a fully loaded amplifier and have zero gain error by definition. However. instead of recovering to zero gain error immediately, the gain of the 1533 nm. channel undershoots the zero gain value by about 0.6 dB and then eventually recovers to zero gain error. The undershoot and slow recovery are due to the slow dynamics of the EDF-PDLE. When all the channels appear, the OGC laser power is decreased and the loss of the PDLE should become larger to increase the amplifier gain. However, because of the long $I_{13/2}$-state Er-ion lifetime of the EDF-PDLE, the power dependent loss remains low at the moment that the OGC laser power decreases. The loss of the PDLE 34 then increases with a time constant of about 10ms (on the order of the $I_{13/2}$-state lifetime of the EDF PDLE) and recovers the amplifier gain to its fully loaded value. PDLEs with fast dynamics such as short lifetime Er fibers or semiconductor saturable absorbers, would reduce the observed undershoot and improve the transient response.

Figure 9:
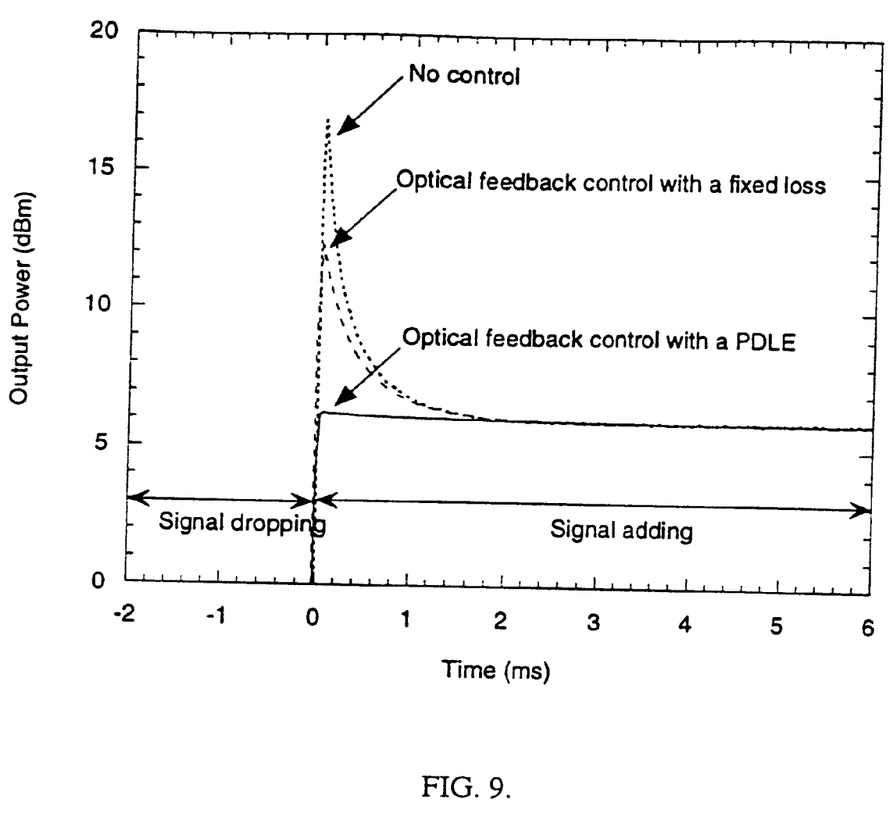
FIG. 9 is a three plot comparison graph of output power versus time for a single channel amplifier (PEA) with no control, optical feedback control with a fixed loss, and optical feedback control with a PDLE in the OFRC, when a 1557.2-nm channel with a power of −6 dBm is added to the PEA.

In a second exemplary embodiment, the transient response of a PEA 10 was characterized under three conditions, namely without transient power control. with optical feedback control with a fixed cavity loss, and with optical feedback control with a PDLE 34 in the cavity, as illustrated in FIG. 9. The add/drop signal is at 1557.2 nm, and the signal power is −6 dBm. An EDF 12 with a length of about 12 m was used as the PDLE. The VOA 32, which had an insertion loss of about 0.3 dB, was used for fine adjustment of the total loss in the optical feedback cavity 30. When a signal with a power of −6 dBm was added into the PEA 10, the output power was about 6 dBm, as shown in the "signal adding" region in FIG. 9. If there is no power control on the PEA, the inversion of the amplifier is high when the signal is dropped because there is only ASE and no saturating signal in the amplifier. As a result, when a signal with −6 dBm of power is added back into the amplifier, the transient power spike is as high as about 17 dBm, as shown. This transient power spike is reduced with optical feedback control. However, it is still 12 dBm which is still considered to be 6 dB too high. The OPC laser has to be turned off with the appearance of the lowest possible input signal power (−12 dBm in the exemplary case). If the optical feedback cavity has a fixed loss, that loss must be high enough; in other words, the total optical feedback cavity loss has to be higher than the optical gain at the OPC laser wavelength when the amplifier has a −12 dBm input channel as its saturating signal. A high optical feedback cavity loss means a low OPC laser power. As a result, when the signal is dropped and the amplifier is saturated by the low power OPC laser, the amplifier inversion is high, in fact higher than when it is saturated by a −6 dBm signal channel. Consequently, there is a transient spike when a signal with −6 dBm of power is added to the amplifier. It can be seen clearly that the transient spike is almost eliminated with a PDLE 34 in the optical feedback cavity 30 because the cavity loss is adjusted dynamically, as explained above. In an alternative aspect of the present invention, the VOA in the optical feedback cavity may be replaced by a well calibrated and performed off-set splice as a loss element.

Another embodiment of the invention is shown with reference to FIG. 2 as an improvement in a conventional 1×N×N wavelength add/drop multiplexed (WADM) optical transmission node 110 that includes an $M_{in} \times N_{out}$ demultiplexer 101 with $M_{in} \geq 1$ and $N_{out} > 1$ for demultiplexing an optical signal having a wavelength range $\Delta\lambda_{in}$ into a plurality of N optical signals (two shown for clarity) each having a discreet wavelength $\lambda_i$ (i=1 to N) or a plurality of N optical signals each having a wavelength range $\Delta\lambda_j$ (j=1 to N−1). There are N add/drop signal propagation paths 103 coupled at one end 105 each thereof to $N_{out}$ of demultiplexer 101, wherein each path 103 includes an optical amplifier 10 as shown in FIG. 4, with the exception that the pump source 18 is commonly shared among the N optical amplifiers 10 via pump paths 121A. An $N_{in} \times Z_{out}$ multiplexer 107 with $Z_{out} \geq 1$, for multiplexing at least some of the $N_{in}$ optical signals, is coupled to another end 109 of each of the N add/drop signal propagation paths. At least some of the optical amplifiers 10 each incorporate an OFRC 30 which comprises a PDLE 34 as described above, thereby addressing the problem of dynamically variable signal input conditions to the amplifiers resulting from channel adding/dropping. All or some of the N optical amplifiers 10 are single channel PEAs or WDM amplifiers depending upon the application. If the amplifiers are PEAs, then changing input conditions will cause output power variations. Likewise, if the amplifiers are WDM amplifiers, changing input conditions will cause gain errors at the amplifier output. In an aspect of this embodiment, an input amplifie 121, preferably being a WDM amplifier, is connected to the demultiplexer 105 at an input of the node. Amplifier 121 preferably equipped with an OFRC 30 including a PDLE 34 according to the invention. In a further aspect, node 10 is equipped with an output amplifier 123, preferably a gain-controlled WDM amplifier.

In another embodiment of the invention, a method for controlling a transient power change in a single channel optical amplifier or reducing a DC gain error in a WDM optical amplifier that are subject to dynamically variable operating conditions at an input of the amplifier, and including an OFRC coupled to a gain medium of the amplifier having an output power that is dynamically dependent upon the operating conditions, includes the step of decreasing the cavity loss of the OFRC as the output power of the OFRC increases or vice-versa, whereby the inversion of the amplifier gain medium is dynamically varied to reduce gain or power changes in the amplifier.

DC gain error results from spectral hole burning which is an artifact of adding or dropping optical signals or increasing/decreasing the pump power to the amplifier, because erbium is not a purely homogeneous medium. The OFRC 30 functions as an optical gain control (OGC) mechanism for the amplifier 10 as described above. Without a PDL in the cavity according to the invention, the cavity loss is fixed and the inversion of the EDF gain medium 12 must increase to maintain the optical gain at the bottom of the spectral hole equal to the optical loss at the OGC laser wavelength. Thus the gain of the channels being amplified increases to cause DC gain error. Providing the laser cavity 30 with a power dependent loss according to the invention decreases the EDF 12 inversion which in turn compensates for the effect of increased inversion caused by the initial spectral hole burning of the OGC laser. Similarly, if the amplifier 10 is a PEA, the method provides for optical power control to reduce transient power spikes resulting from changing amplifier input conditions.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A wavelength add/drop multiplexed (WADM) amplified optical transmission node, comprising:

an $M_{in} \times N_{out}$ port demultiplexer with $M_{in} \geq 1$ and $N_{out} > 1$;

N add and/or drop signal propagation paths each having one end coupled to one of the $N_{out}$ ports;

an optical amplifier having a gain medium located within at least one of the N add and/or drop signal propagation paths; and an $N_{in} \times Z_{out}$ port multiplexer with $Z_{out} \geq 1$, wherein another end of each of the N paths is coupled to one of the $Z_{out}$ ports;

characterized in that, each optical amplifier includes an optical feedback resonant laser cavity coupled to the gain medium; and a power dependent loss element within each optical feedback resonant laser cavity which exhibits a decreasing loss as a function of an increasing incident laser light intensity into the power dependent loss element.

2. The node of claim 1, wherein the power dependent loss element includes at least one of an active mechanism and a passive mechanism.

3. The node of claim 2, wherein the active mechanism comprises a light intensity modulator and a feedback control.

4. The node of claim 2, wherein the passive mechanism comprises a saturable absorber.

5. The node of claim 4, wherein the saturable absorber is a rare earth doped fiber.

6. The node of claim 4, wherein the saturable absorber is a length of erbium doped fiber.

7. The node of claim 2, wherein the optical feedback resonant laser cavity is a ring cavity.

8. The node of claim 2, wherein the optical feedback resonant laser cavity is a linear cavity.

9. The node of claim 7, wherein the optical feedback resonant laser cavity is coupled to the gain medium by a wavelength selective coupler for coupling a lasing wavelength into the optical feedback resonant laser cavity.

10. The node of claim 9, wherein the lasing wavelength propagates in the optical feedback resonant laser cavity co-directionally with an optical signal input to the amplifier.

11. The node of claim 1, wherein the gain medium is a rare earth doped fiber.

12. The node of claim 11, wherein the rare earth doped fiber is an erbium doped fiber.

13. The node of claim 1, further comprising a pump source coupled to a plurality of the optical amplifiers each located in one of the propagation paths for providing excitation energy to said amplifiers.

14. The node of claim 13 wherein the pump source is a light source.

15. The node of claim 13, wherein the pump source is a current source.

16. The node of claim 1, further comprising a WDM optical amplifier coupled to the demultiplexer at an input of the node, wherein the WDM optical amplifier includes one of the optical feedback resonant laser cavities and one of the power dependent loss elements.

17. The node of claim 1, wherein the optical amplifier is a single channel amplifier.

18. The node of claim 1, wherein a the optical amplifier is a WDM amplifier.

19. An optical amplifier, comprising:

an inhomogeneous gain medium;

a pump source coupled to the gain medium;

an optical feedback resonant laser cavity coupled to the gain medium; and a power dependent loss element within the optical feedback resonant laser cavity which exhibits a decreasing loss as a function of an increasing incident laser light intensity into the power dependent loss element, wherein said cavity corrects for hole burning created by inhomogenuity in said inhomogeneous gain medium.

20. The amplifier of claim 19, wherein said amplifier is a WDM amplifier, characterized in that the amplifier is subject to a dynamically variable operating condition at an input of the amplifier which contributes to a gain error at an output of the amplifier, whereby the optical feedback resonant laser cavity exhibits a dynamically variable loss or gain as a function of the dynamically variable operating condition for improving the gain error.

21. The amplifier of claim 19, wherein said amplifier is a single channel amplifier, characterized in that the amplifier is subject to a dynamically variable operating condition at an input of the amplifier which contributes to an output power variation at an output of the amplifier, whereby the optical feedback resonant laser cavity exhibits a dynamically variable loss or gain as a function of the dynamically variable operating condition for compensating the output power variation.

22. An optical amplifier, comprising:

a gain medium;

a pump source coupled to the gain medium;

an optical feedback resonant laser cavity coupled to the gain medium; and a power dependent loss element within the optical feedback resonant laser cavity which exhibits a decreasing loss as a function of an increasing incident laser light intensity into the power dependent loss element, wherein the power dependent loss element includes at least one of an active mechanism.

23. The amplifier of claim 22, wherein the active mechanism comprises a light intensity modulator and a feedback control.

24. The amplifier of claim 22, wherein the passive mechanism comprises a saturable absorber.

25. The amplifier of claim 24, wherein the saturable absorber is a rare earth doped fiber.

26. The amplifier of claim 24, wherein the saturable absorber is a length of erbium doped fiber.

27. The amplifier of claim 19, wherein the optical feedback resonant laser cavity is a ring cavity.

28. The amplifier of claim 19, wherein the optical feedback resonant laser cavity is a linear cavity.

29. The amplifier of claim 19, wherein the optical feedback resonant laser cavity is coupled to the gain medium by a wavelength selective component for coupling a lasing wavelength into the optical feedback resonant laser cavity.

30. The amplifier of claim 27, wherein a lasing wavelength propagates co-directionally with an input optical signal.

31. The amplifier of claim 19, wherein the gain medium is a rare earth doped fiber.

32. The amplifier of claim 31, wherein the rare earth doped fiber is an erbium doped fiber.

33. The amplifier of claim 19, wherein the pump source is a light source.

34. The amplifier of claim 19, wherein the pump source is a current source.

35. The amplifier of claim 19, wherein the gain medium is a semiconductor.

36. An optical amplifier providing gain to optical signals within a predetermined wavelength range, said optical amplifier comprising:
- a gain medium;
- a pump source coupled to the gain medium;
- an optical feedback resonant laser cavity coupled to the gain medium, said cavity utilizing light in a wavelength providing within said wavelength range, said light not being provided by an additional external source; and
- a power dependent loss element within the optical feedback resonant laser cavity which exhibits a decreasing loss as a function of an increasing incident laser light intensity into the power dependent loss element.

* * * * *